US006995973B2

(12) United States Patent
Barsun et al.

(10) Patent No.: US 6,995,973 B2
(45) Date of Patent: Feb. 7, 2006

(54) PREVENTING A PLURALITY OF ELECTRONIC DEVICES FROM BEING PULLED OUT OF A RACK SIMULTANEOUSLY

(75) Inventors: Stephan Karl Barsun, Davis, CA (US); Sachin Navin Chheda, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 162 days.

(21) Appl. No.: 10/620,640

(22) Filed: Jul. 15, 2003

(65) Prior Publication Data

US 2005/0013096 A1    Jan. 20, 2005

(51) Int. Cl.
*H05K 5/00* (2006.01)

(52) U.S. Cl. .................... 361/679; 361/724; 369/31.01

(58) Field of Classification Search ................ 361/685, 361/724–727, 679; 369/31.01
See application file for complete search history.

(56) References Cited

U.S. PATENT DOCUMENTS 5,757,594 A * 5/1998 Dang et al. .............. 369/30.75

OTHER PUBLICATIONS

Universal Rack Mount Kit Installation Instructions For 19" & 23" 2-Post and 4-Post Racks; 2003 Intel Corporation A90630-002; 7 pages.
L-Bracket Mount Kit Installation Instructions for 19" 2-Post Racks; 2003 Intel Corporation A88664-006; 2 pages.
Universal Rack Mount Kit (with Stop Feature) Installation Instructions for 19" & 23" 2-Post and 4-Post Racks; 2003 Intel Corporation C25364-001; 10 pages.
HP Rack System Stability Information; Jan. 2002; Hewlett-Packard Comapany ; 2 pages.
Installation Guide HP J1528A Rack Integration Kit; Hewlett-Packard Cmpany; Copyright 03/02; Doc # J1528-900019 pages.
Installation Guide HP J1530A Rack Integration Kit; Hewlett-Packard Company; Copyright 03/02; Doc # J153-9000212pages.

* cited by examiner

*Primary Examiner*—Yean-Hsi Chang

(57) ABSTRACT

One embodiment of the invention includes a method for preventing a plurality of electronic devices from being pulled out of an equipment rack simultaneously. The method includes determining with an electronic sensor module whether an electronic device of a plurality of electronic devices coupled to the equipment rack is being slid out of the equipment rack. Provided the electronic device is being slid out of the equipment rack, an electronic locking module prevents any remaining electronic device of the plurality of electronic devices from being slid out of the equipment rack. A determination is made as to whether the electronic device has been slid back into the equipment rack. Provided the electronic device has been slid back into the equipment rack, the prevention is deactivated.

20 Claims, 7 Drawing Sheets

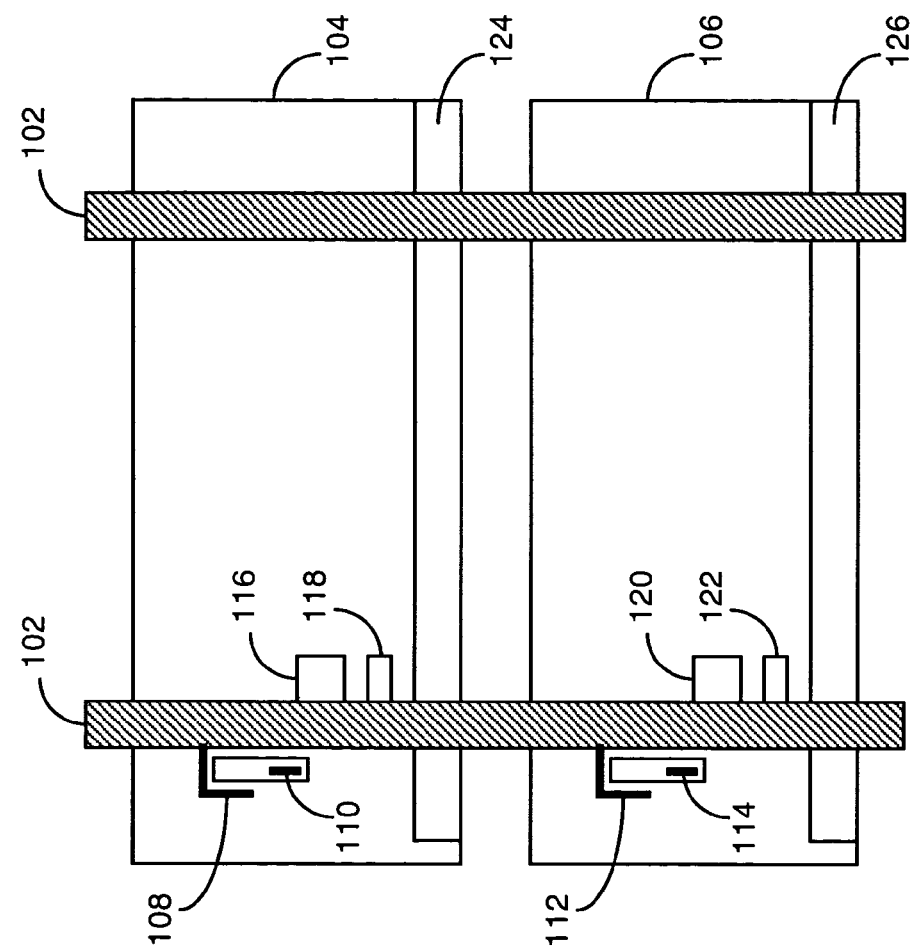

PREVENTING A PLURALITY OF ELECTRONIC DEVICES FROM BEING PULLED OUT OF A RACK SIMULTANEOUSLY

BACKGROUND

Data centers include different types of electronic equipment such as servers and disk arrays that store all types of data. Data centers basically makeup the backside of the Internet, but they can also be implemented as part of a campus of one or companies for enabling them to perform their functionalities. Typically, equipment racks are utilized within data centers as a way of organizing and housing different types of electronic equipment therein. The equipment racks usually include 4 vertical columns (but some times may include 2 columns) thereby enabling the electronic equipment of the data center such as servers and disk arrays to be mounted thereto.

There are typically two ways of mounting equipment and/or devices on an equipment rack. For example, a piece of electronic equipment such as a disk array can be bolted to the rack. Furthermore, a piece of equipment such as a server can be attached to sliding rails which are then mounted to the equipment rack. In this manner, the piece of equipment is able to be slid out from the rack by someone thereby enabling him or her to more easily inspect and/or performance maintenance to that particular piece of equipment.

However, there are disadvantages associated with equipment racks that have one or more electronic devices mounted to it with sliding rails. For example, if one or more electronic devices are slid out from the equipment rack into a cantilevered position, the rack can tip over possibly causing human injury and/or damage to the equipment mounted to the rack. It is noted that some of the electronic equipment that is mounted to a rack can individually weigh much more than 100 kilograms (kg). As such, a collective weight of over 400 kg or even more could possibly fall on someone located near the rack.

One conventional way of attempting to solve this rack tipping problem is to add anti-tip "feet" to the front and rear of an equipment rack to reduce its instability. Specifically, the front and rear feet typically are implemented in some type of steel "L" bracket shape that are mounted to the front and rear of the equipment rack. The rear foot can also be bolted to a floor of the data center or ballast can be used to weight down the rear foot. However, there are disadvantages associated with this front and rear feet technique.

For example, the utilization of front and rear feet still fail to prevent a large amount of electronic equipment from being cantilevered out from the equipment rack in such a manner that the rack tips over.

Another conventional way of attempting to solve this rack tipping problem is to attach multiple equipment racks together to try to reduce the instability of each rack. However, one of the disadvantages associated with this technique is that it can also fail since it does not prevent a large amount of electronic equipment from being cantilevered out from the multiple equipment racks causing them to tip over.

A third conventional way of attempting to solve this rack tipping problem is to utilize a complicated mechanical system. A few of the disadvantages associated with this technique is that it is expensive, complicated and also can be prone to something of its mechanical system jamming, breaking, or becoming inoperable.

The present invention may address one or more of the above issues.

SUMMARY OF THE INVENTION

One embodiment of the invention includes a method for preventing a plurality of electronic devices from being pulled out of an equipment rack simultaneously. The method includes determining with an electronic sensor module whether an electronic device of a plurality of electronic devices coupled to the equipment rack is being slid out of the equipment rack. Provided the electronic device is being slid out of the equipment rack, an electronic locking module prevents any remaining electronic device of the plurality of electronic devices from being slid out of the equipment rack. A determination is made as to whether the electronic device has been slid back into the equipment rack. Provided the electronic device has been slid back into the equipment rack, the prevention is deactivated.

BRIEF DESCRIPTION OF THE DRAWINGS

FIGS. 1A and 1B are block diagrams of side views of an electronic interlock equipment rack system in accordance with an embodiment of the present invention.

DESCRIPTION OF THE PREFERRED EMBODIMENTS

Reference will now be made in detail to embodiments of the invention, examples of which are illustrated in the accompanying drawings. While the invention will be described in conjunction with embodiments, it is noted that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail so as not to unnecessarily obscure aspects of the present invention.

Figure 1B:
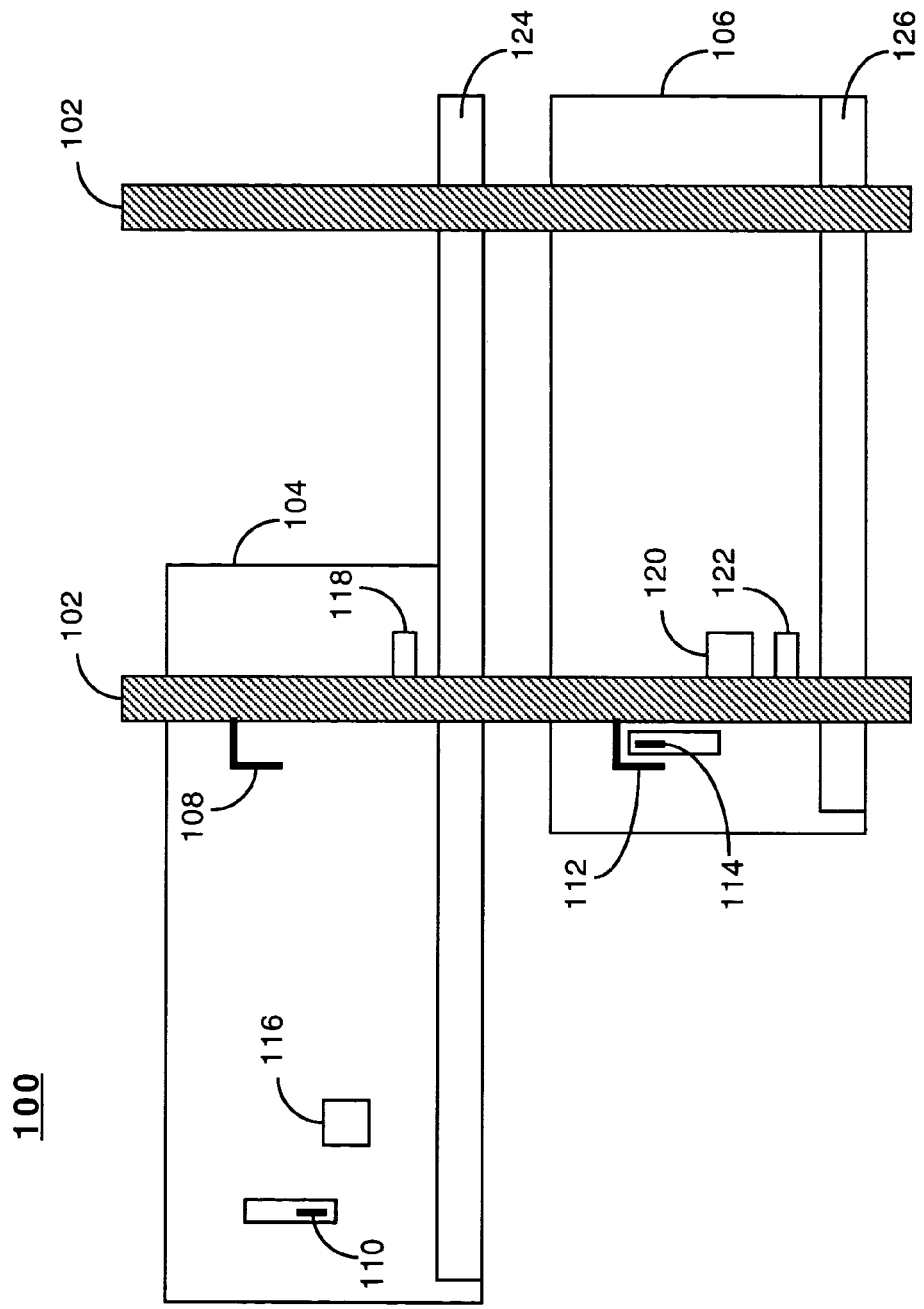

FIGS. 1A and 1B are block diagrams of side views of an electronic interlock equipment rack system 100 in accordance with an embodiment of the present invention. Specifically, electronic interlock system 100 prevents more than one piece of electronic equipment (e.g., servers, routers, disk arrays, computing devices, and/or telecommunications devices) from being pulled out simultaneously from an equipment rack 102.

For example, when electronic equipment 104 is slid out (and/or has been slid out) on rail set 124 from a retracted position to an extended position of rack 102 as shown in FIG. 1B, a sensor module 116 associated with electronic device 104 detects this action and sends a signal to a control module (not shown) that it is electrically coupled to. In response to receiving the signal from sensor module 116, the control module activates all of the locking modules (e.g., 114) associated with any other electronic equipment (e.g., 106) coupled to rack 102 as shown in FIG. 1B in order to prevent them from being slid or pulled out of the retracted position of rack 102. In this manner, just one piece of electronic equipment (e.g., 104) is able to be pulled out from rack 102 at a time. As such, electronic interlock equipment rack system 100 significantly reduces the chances that rack 102 will tip over.

Continuing with the example, when electronic device 104 is being and/or has been pushed or slid back into the retracted position of rack 102 as shown in FIG. 1A, sensor module 116 can also detect this action and sends a signal to the control module indicating this situation. In response to receiving this signal from sensor module 116, the control module deactivates all of the locking modules (e.g., 114) associated with any other electronic equipment (e.g., 106) coupled to rack 102 as shown in FIG. 1A. Therefore, the pieces of electronic equipment (e.g., 104 and 106) coupled to rack 102 that are in the retracted position can separately be slid or pulled out of rack 102.

Within FIG. 1A, electronic interlock equipment rack system 100 includes electronic equipment 104 and 106 which are both coupled to equipment rack 102 with rail sets 124 and 126, respectively. It is noted that rail sets 124 and 126 can each include a companion rail (not shown) that can be coupled to rack 102 and its corresponding electronic equipment (e.g., 104 or 106). It is noted that electronic equipment 104 and 106 may be implemented in a wide variety of ways in accordance with the present embodiment. For example, electronic equipment 104 and 106 can each be implemented as, but is not limited to, a server computer, a router, a disk array, a computing device, an electronic data storage device, a telecommunications device, or any other type of electronic equipment or device that may be mounted to an equipment rack (e.g., 102).

Sensor module 116 is coupled to electronic equipment 104 which detects a "target" 118 that is coupled to equipment rack 102. Additionally, sensor module 120 is coupled to electronic equipment 106 which detects a "target" 122 that is also coupled to equipment rack 102. Sensor modules 116 and 120 may be implemented in diverse ways in accordance with the present embodiment. For example, sensor modules 116 and 120 can each be implemented as, but is not limited to, an optical sensor, a proximity sensor, a mechanical switch, a mechanical sensor, an electro-mechanical sensor, an ultrasonic sensor, a hall-effect sensor, a Linear Variable Differential Transformer (LVDT), or any other means of sensing if an electronic device (e.g., 104 or 106) is in rack 102. It is noted that sensor modules 116 and 120 can be implemented without utilizing targets 118 and 122, respectively. For example, instead of including targets 118 and 122, sensor modules 116 and 120 may be positioned on electronic devices 104 and 106 such that they can detect the proximity of one of the vertical support columns of rack 102.

Within FIG. 1B, when sensor module 116 of electronic device 104 indicates to the control module (not shown) that it has been (and/or is being) slid out of the retracted position of rack 102, the control module causes locking module 114 of electronic device 106 to move a pin or other type of latch into a position such that it will be caught by a hook or catch 112 coupled to rack 102, thereby locking electronic equipment 106 in rack 102 and preventing it from being slid out of its retracted position within rack 102. It is noted that locking modules 110 and 114 can operate in conjunction with catches 108 and 112, respectively. However, locking modules 110 and 114 can each be implemented not to include hooks 108 and 112. It is appreciated that locking modules 110 and 114 can be implemented in a wide variety of ways in accordance with the present embodiment.

For example, locking modules 110 and 114 can each be implemented as, but is not limited to, a solenoid, a solenoid capable of engaging and disengaging a pin or a type of latch, an electric motor capable of engaging and disengaging a pin or a type of latch, an electro-mechanical device, solid state circuitry, a magnetic latch, or any other means for preventing an electronic device (e.g., 104 or 106) from being pulled out of rack 102. It is noted that if a magnetic latch is utilized as an implementation of locking module 110 and/or 114, it may not be desirable to have it involve too strong of a magnetic force since it may interfere with the proper operations of the electronic device (e.g., 104 and/or 106) it is associated with. Additionally, the magnetic latch may involve the continuous application of current when it is activated which may not be desirable in some situations.

The electronic interlock equipment rack system 100 is well suited to be altered in diverse ways in accordance with the present embodiment. For example, locking modules 110 and 114 can be coupled to rack 102 (instead of to electronic devices 104 and 106, respectively) in a manner to prevent an electronic device (e.g., 104 or 106) from being slid out from rack 102. Specifically, locking modules 110 and 114 may each be implemented as a solenoid that can move a pin or latch into and out of a locked position. As such, locking modules 110 and 114 may be coupled to rack 102 such that each pin or latch of the solenoid extends into a recess (or cavity) of electronic device 104 or 106 thereby locking it into its retracted position.

Furthermore, sensor modules 116 and 120 can be coupled to rack 102 (instead of to electronic devices 104 and 106, respectively) in a manner to detect an electronic device (e.g., 104 or 106) being and/or having been slid out from a retracted position of rack 102. It is noted that both sensor modules 116 and 120 and locking modules 110 and 114 can be coupled to rack 102. Alternatively, locking modules 110 and 114 can be coupled to rack 102 while sensor modules 116 and 120 are coupled to electronic devices 104 and 106, respectively. In another embodiment, sensor modules 116 and 120 can be coupled to rack 102 while locking modules 110 and 114 are coupled to electronic devices 104 and 106, respectively. It is appreciated that locking modules 110 and 114 and sensor modules 116 and 120 can be coupled to rack 102 and/or electronic devices 104 and 106, respectively, in a wide variety of ways in accordance with the present embodiment.

It is noted that electronic interlock equipment rack system 100 of FIGS. 1A and 1B may be implemented to include any number of sensor modules, locking modules, and electronic equipment that operate in a manner similar to that described herein.

Figure 2:
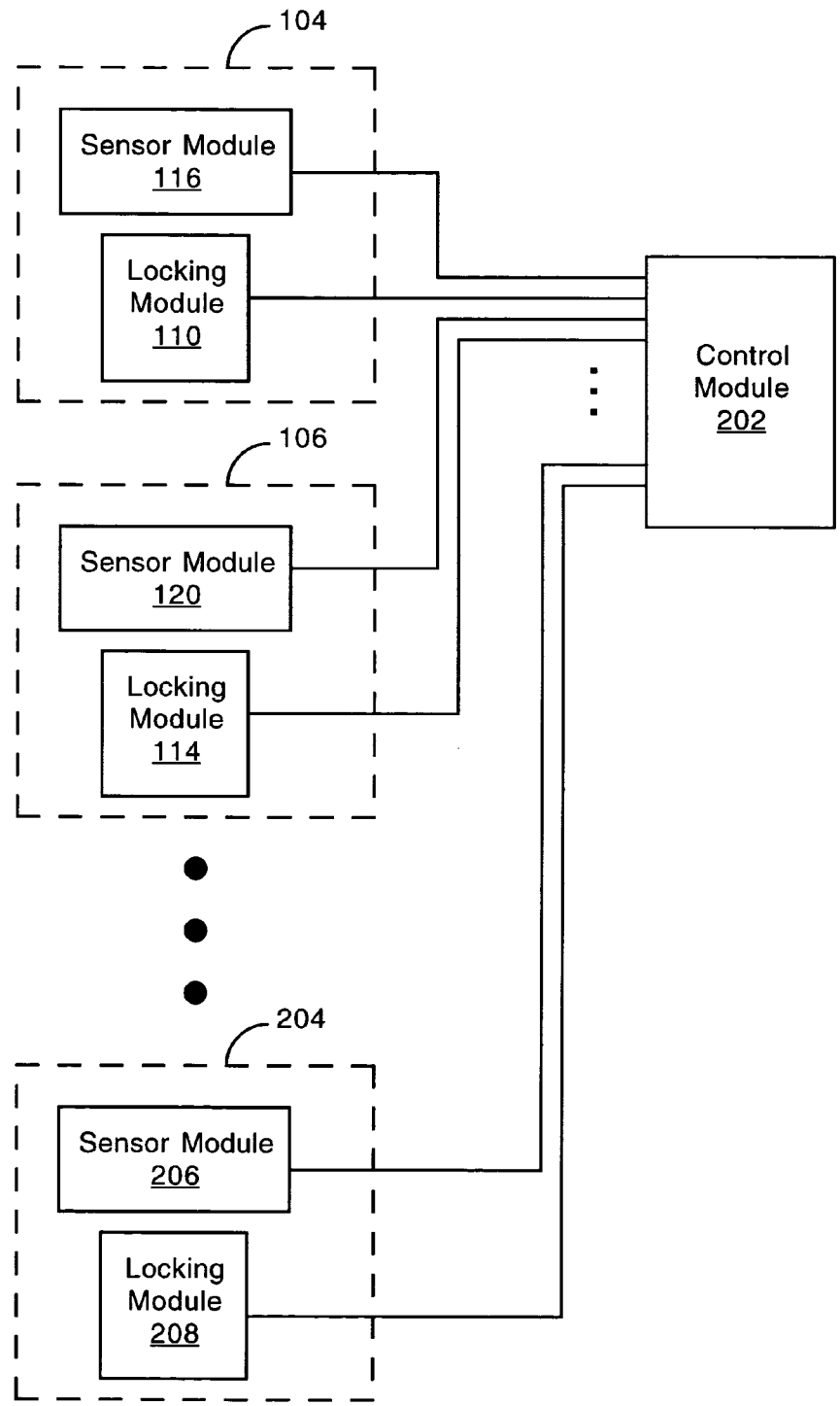
FIG. 2 is a block diagram illustrating an embodiment in accordance with the present invention for coupling modules of an electronic interlock equipment rack system.

FIG. 2 is a block diagram illustrating an embodiment in accordance with the present invention for coupling modules of an electronic interlock equipment rack system 200. Specifically, when a control module 202 is coupled to sensor modules 116, 120 and 206 along with locking modules 110, 114 and 208, the electronic interlock equipment rack system 200 can operate in a manner similar to that described herein with reference to FIGS. 1A and 1B.

For example, when a sensor module (e.g., 120) detects that its electronic device (e.g., 106) is being and/or has been pulled or slid out of rack 102, it transmits a signal indicating this condition to control module 202. Upon receipt of the signal, control module 202 outputs one or more signals which activate particular locking modules (e.g., 110 and 208) thereby preventing the other electronic equipment (e.g., 104 and 204) from being slid or pulled out of rack 102.

Conversely, within this example, when the sensor module (e.g., 120) detects that its electronic device (e.g., 106) is being and/or has been pushed or slid back into rack 102, it transmits a signal indicating this condition to control module 202. Upon receipt of this signal, control module 202 outputs one or more signals which deactivate the particular locking modules (e.g., 110 and 208) thereby enabling the electronic equipment (e.g., 104, 106 and 204) to each be separately pulled or slid out from rack 102.

Specifically, within FIG. 2, sensor module 116 and locking module 110 that are associated with electronic device 104 are each electrically coupled to control module 202. Additionally, sensor module 120 and locking module 114 that are associated with electronic device 106 are each electrically coupled to control module 202. Furthermore, a sensor module 206 and locking module 208 that are associated with an electronic device 204 are each electrically coupled to control module 202. It is noted that electronic interlock equipment rack system 200 may be implemented to include any number of sensor modules and locking modules that are coupled to control module 202 in a manner similar to that shown in FIG. 2. It is appreciated that electronic equipment 204, sensor module 206, and locking module 208 may each be implemented in a manner similar to electronic equipment 104, sensor module 116, and locking module 110, respectively, described herein.

The control module 202 may be implemented in a wide variety of ways in accordance with the present embodiment. For example, control module 202 can be implemented as, but is not limited to, a processor, a controller, a state machine, a microprocessor, or any other means for controlling the functionality of one or more locking modules (e.g., 110, 114 and/or 208) based on signals received from one or more sensor modules (e.g., 116, 120 and/or 206). It is understood that control module 202 can be physically coupled to an equipment rack (e.g., 102), a rail slide (e.g., 124), electronic equipment (104) coupled to a rail slide, or any other desirable location.

It is noted that control module 202 of FIG. 2 is one embodiment in accordance with the present invention of a control module that can be used in combination with electronic interlock equipment rack system 100 of FIGS. 1A and 1B. Furthermore, the sensor modules 116 and 120, locking modules 110 and 114, and control module of electronic interlock equipment rack system 100 can be coupled in a manner similar to electronic interlock equipment rack system 200 of FIG. 2.

Figure 3:
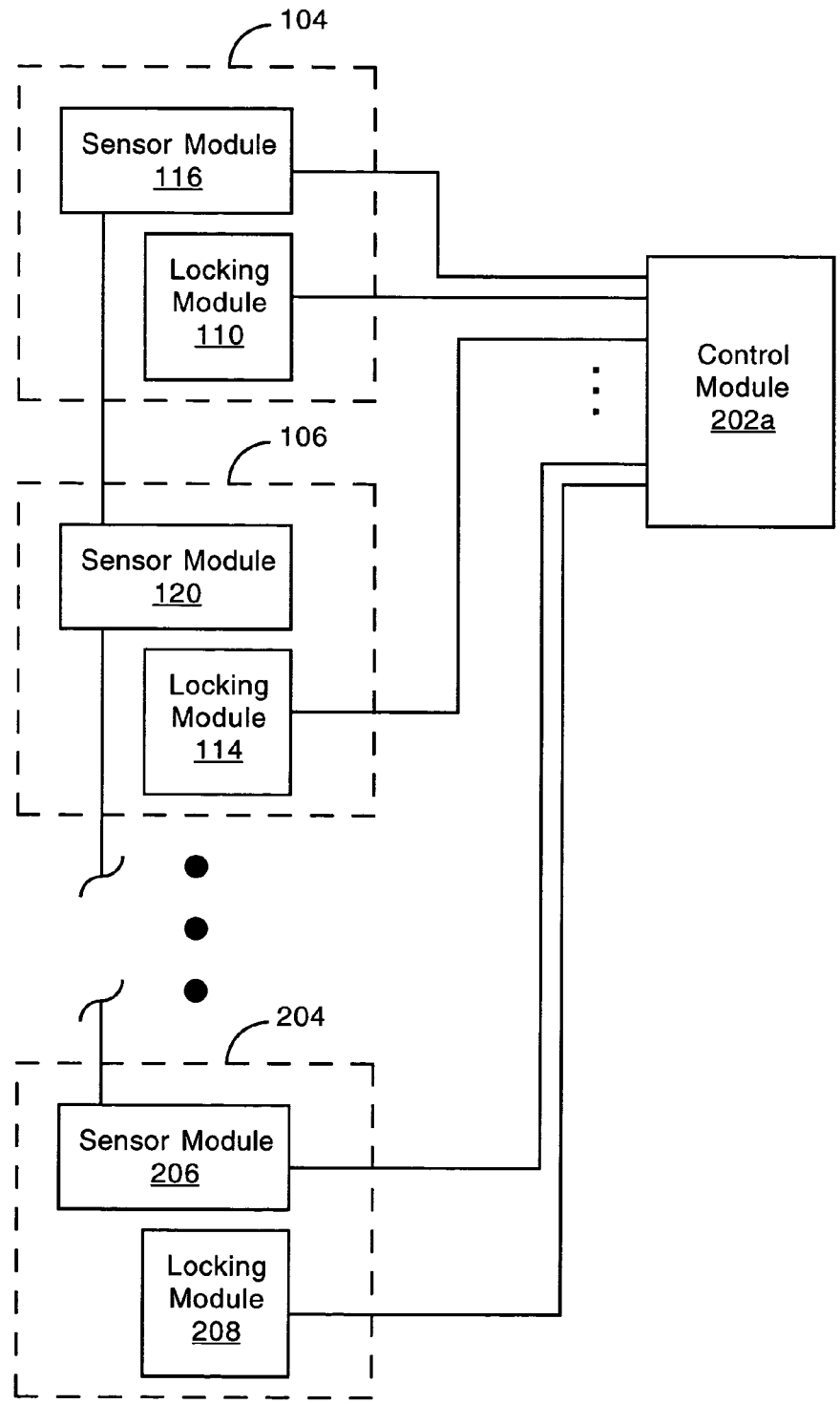
FIG. 3 is a block diagram illustrating another embodiment in accordance with the present invention for coupling modules of an electronic interlock equipment rack system.

FIG. 3 is a block diagram illustrating an embodiment in accordance with the present invention for coupling modules of an electronic interlock equipment rack system 300. Specifically, when control module 202a is coupled to sensor modules 116, 120 and 206 along with locking modules 110, 114 and 208, the electronic interlock equipment rack system 300 can prevent more than one piece of electronic equipment from being pulled or slid out of rack 102.

For example, since sensor modules 116, 120 and 206 are electrically coupled in series, when a sensor module (e.g., 206) detects that its electronic device (e.g., 204) is being and/or has been slid or pulled out of rack 102, it creates an opening within that circuit thereby causing current to stop flowing through sensor modules 116, 120 and 206. In response to this open circuit, control module 202a outputs one or more signals that activates all of the locking modules (e.g., 110, 114 and 208) thereby preventing specific electronic equipment (e.g., 104 and 106) from being slid or pulled out of rack 102. As the electronic equipment (e.g., 204) is in the process of being pulled out of rack 102, it may be desirable that that its locking module (e.g., 208) be positioned such that it does not interfere with or hamper that process when activated. Additionally, it may also be desirable that the activated locking module (e.g., 208) associated with the sliding electronic equipment (e.g., 204) be implemented such that it allows its electronic equipment (e.g., 204) to be slid or pushed back into equipment rack 102.

Additionally, within this example, when the electronic device (e.g., 204) is being and/or has been pushed or slid back into rack 102, this causes its associated sensor module (e.g., 206) to close the open circuit thereby enabling current to flow through sensor modules 116, 120 and 206. In response to the closed circuit, control module 202a outputs one or more signals which deactivates the locking modules (e.g., 110, 114 and 208) thereby enabling again the electronic equipment (e.g., 104, 106 and 204) to each be separately pulled or slid out from equipment rack 102.

Specifically, within FIG. 3, sensor module 116 and locking module 110 that are associated with electronic equipment 104 are each electrically coupled to control module 202a. Furthermore, sensor module 120 which is associated with electronic equipment 106 is electrically coupled in series with sensor module 116 while locking module 114 is electrically coupled to control module 202a. Moreover, sensor module 206 which is associated with electronic equipment 204 may be coupled in series to sensor module 120 and to control module 202a while locking module 208 is electrically coupled to control module 202a. It is noted that electronic interlock equipment rack system 300 may be implemented to include any number of sensor modules and locking modules that can be coupled in a manner similar to that shown in FIG. 3. Furthermore, it is understood that control module 202a can be physically coupled to an equipment rack (e.g., 102), a rail slide (e.g., 124), electronic equipment (104) coupled to a rail slide, or any other desirable location.

It is appreciated that the sensor modules 116 and 120, locking modules 110 and 114, and control module of electronic interlock equipment rack system 100 of FIGS. 1A and 1B can be coupled in a manner similar to electronic interlock equipment rack system 300 of FIG. 3.

Figure 4:
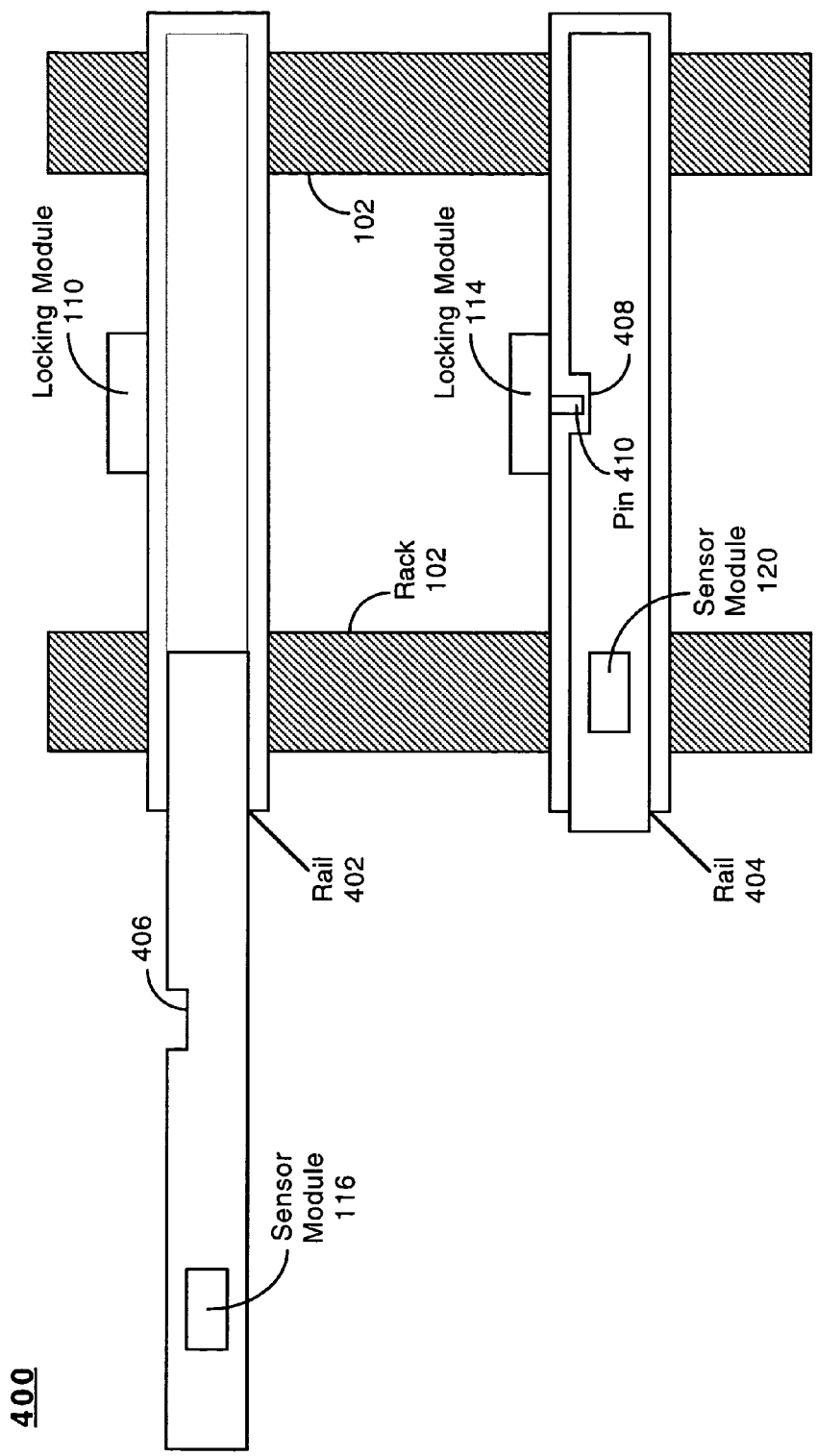
FIG. 4 is a block diagram of a side view of an electronic interlock equipment rack system in accordance with another embodiment of the present invention.

FIG. 4 is a block diagram of a side view of an electronic interlock equipment rack system 400 in accordance with an embodiment of the present invention. Specifically, electronic interlock rack system 400 prevents more than one piece of electronic equipment (e.g., servers) from being pulled out simultaneously from equipment rack 102. It is noted that FIG. 4 depicts the inner part of rail slides 402 and 404 which can each be coupled to a piece of electronic equipment (e.g., 104 or 106). Additionally, rail slides 402 and 404 are coupled to equipment rack 102. Within the present embodiment, sensor module 116 and locking module 110 can be coupled to or incorporated with rail slide 402 while sensor module 120 and locking module 114 can be coupled to or incorporated with rail slide 404. In this manner, the electronic equipment (e.g., 104) that may be coupled to rail slide 402 or 404 has a portion of electronic interlock rack system 400 coupled to it.

Within electronic interlock rack system 400, sliding rail 402 has been implemented to include a catch 406 (or notch) while sliding rail 404 has also been implemented to include a catch 408 (or notch). It is noted that catches 406 and 408 operate in conjunction with locking modules 110 and 114, respectively. For example, when a piece of electronic equipment (e.g., 104) that is not shown is coupled to a rail (e.g., 402) is being and/or has been pulled or slid out of rack 102 into an extended position, its sensor module (e.g., 116) can detect and send a signal indicating this action to a control module (e.g., 202) that is not shown. In response to receiving this indication, the control module can activate (or engage) one or more specific locking modules (e.g., 114) thereby causing them to each move a pin (e.g., 410) or other type of latch into the catch or notch (e.g., 408) of its corresponding rail (e.g., 404). In this manner, the rails (e.g., 404) coupled to the electronic equipment (e.g., 106) are substantially immobilized thereby preventing any of them from being pulled out to an extended position from rack 102 while a first electronic device (e.g., 104) is already in the extended position.

Furthermore, when the piece of electronic equipment (e.g., 104) is in the process of being and/or has been pushed back from its extended position into a retracted position within rack 102, its sensor module (e.g., 116) can detect this situation and sends a signal indicating it to the control module. Upon receipt of the signal, the control module can deactivate (or disengage) the one or more specific locking modules (e.g., 114) causing them to each remove a pin (e.g., 410) or other type of latch from the catch or notch (e.g., 408) of its corresponding rail (e.g., 404). Therefore, the electronic equipment (e.g., 104 and 106) coupled to rails 402 and 404 can again be pulled or slid out of rack 102 separately from a retracted position to an extended position.

Within FIG. 4, the control module (e.g., 202) of electronic interlock equipment rack system 400 may be electrically coupled to sensor modules 116 and 120 along with locking modules 110 and 114 in a manner similar to that shown in FIG. 2 and/or FIG. 3, described herein. Additionally, a wiring harness may be utilized to electrically couple sensor modules 116 and 120 along with locking modules 110 and 114 to the control module of electronic interlock equipment rack system 400. The control module of electronic interlock equipment rack system 400 can be physically coupled to equipment rack 102, rail slide 402 or 404, a piece of electronic equipment coupled to rail slide 402 or 404, or any other desirable location.

Within electronic interlock equipment rack system 400, it is noted that an electronic device (e.g., 104 or 106) may be implemented with two or more rails similar to rail slide 402 that may be coupled to an equipment rack (e.g., 102). Within this particular embodiment, the electronic device includes multiple means for being locked into place within the equipment rack (e.g., 102). Alternatively, an electronic device (e.g., 104 or 106) may be implemented with one rail similar to rail slide 402 along with one or more conventional rail slides. Within this particular embodiment, expenses can be reduced while implementing an electronic interlock rack system (e.g., 400) that operates in a manner similar to that described herein.

Figure 5:
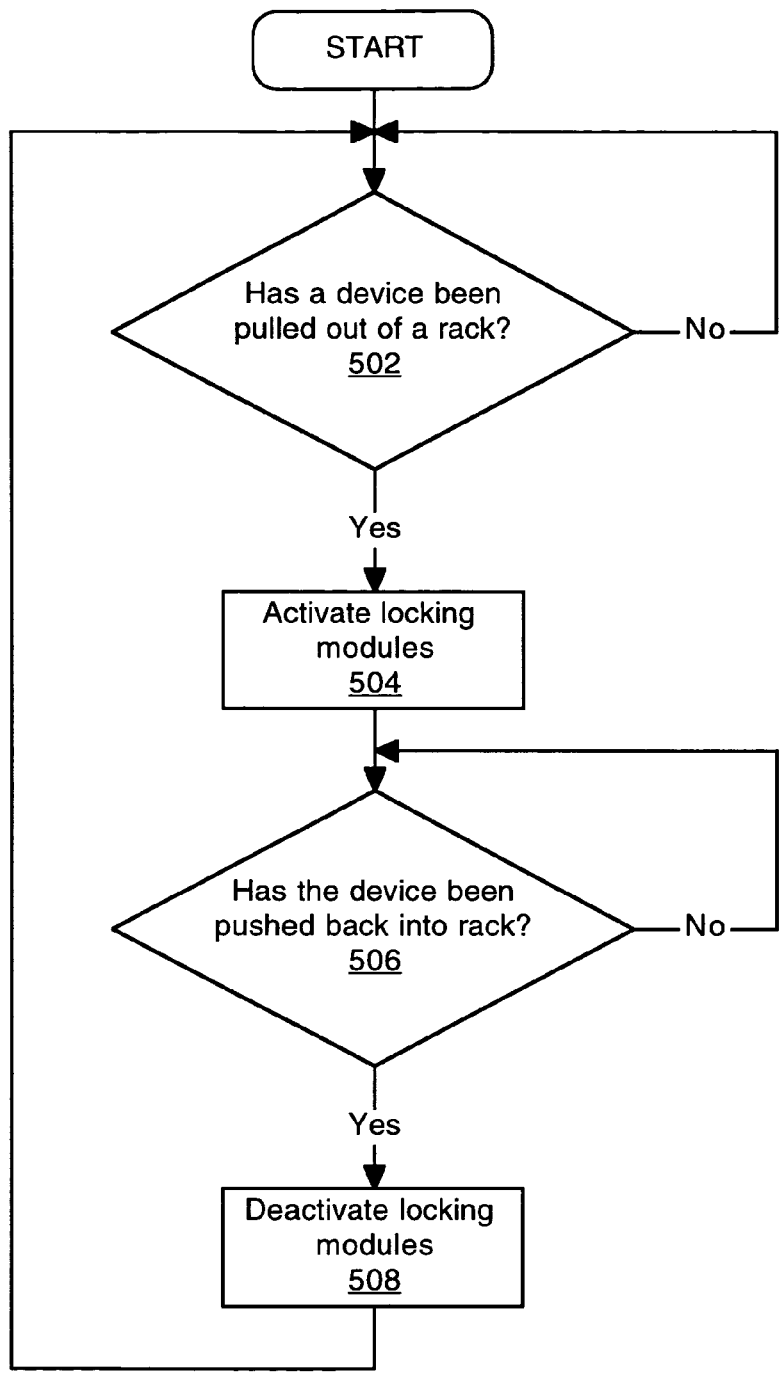
FIG. 5 is a flowchart of operations performed in accordance with an embodiment of the present invention for preventing no more than one device at a time from being pulled out of an equipment rack.

FIG. 5 is a flowchart 500 of operations performed in accordance with an embodiment of the present invention for preventing no more than one device at a time from being pulled out of an equipment rack. Flowchart 500 includes processes which, in some embodiments, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific operations are disclosed in flowchart 500, such operations are exemplary. That is, the present embodiment is well suited to performing various other operations or variations of the operations recited in FIG. 5. Within the present embodiment, it should be appreciated that the operations of flowchart 500 may be performed by software, by hardware or by any combination of software and hardware.

The present embodiment provides a method for preventing multiple electronic devices or equipment from being pulled out of an equipment rack simultaneously. For example, a determination is made as to whether a device coupled to an equipment rack by slide rails in a retracted position has been pulled out and/or is in the process of being pulled and/or slid out of that position of the rack. If not, the determination is continually repeated. If so, one or more locking modules are activated or engaged thereby preventing other devices in the retracted position from being pulled and/or slid out of the equipment rack. An additional determination is made as to whether the device in its extended position is in the process of being and/or has been slid and/or pushed back into the retracted position of the equipment rack. If not, this determination is continually repeated. If so, all of the locking modules that were previously activated or engaged are now deactivated or disengaged thereby enabling each of the devices in the retracted position to once again be separately pulled and/or slid out of that position of the equipment rack. As such, the method of the present embodiment can then be repeated starting with the first operation.

At operation 502 of FIG. 5, a determination is made as to whether a device (e.g., 104 or 106) coupled to an equipment rack (e.g., 102) by slide rails (e.g., 124 or 402) that is in a retracted position has been slid or pulled out and/or is in the process of being pulled or slid out of that position of the rack. If the device has not been and/or is not in the process of being pulled out of the retracted position at operation 502, process 500 proceeds to the beginning of operation 502. However, if the device has been pulled out and/or is in the process of being pulled out of the retracted position at operation 502, process 500 proceeds to operation 504.

At operation 504, one or more locking modules (e.g., 110, 114 and/or 208) are activated and/or engaged in order to prevent other devices (e.g., 106 and 204) coupled to the equipment rack with slide rails and in the retracted position from being pulled or slid out of the equipment rack at the same time that the first device (e.g., 104) is in its extended position. In this manner, no more than one device is allowed to be pulled and/or slid out of the equipment rack utilizing slide rails.

At operation 506 of FIG. 5, a determination is made as to whether the device (e.g., 104) that was previously slid out into its extended position from the equipment rack has been and/or is in the process of being slid and/or pushed back into the retracted position of the equipment rack. If the device in the extended position has not been (and/or is not being) pushed and/or slid back into the equipment rack at operation 506, process 500 proceeds to the beginning of operation 506. However, if the device in the extended position has been (and/or is being) pushed and/or slid back into the equipment rack at operation 506, process 500 proceeds to operation 508.

At operation 508, all of the locking modules that were previously activated or engaged are now deactivated or disengaged thereby enabling each of the devices in the retracted position to be separately pulled and/or slid out of the rack. Once operation 508 is completed, process 500 proceeds to the beginning of operation 502.

Figure 6:
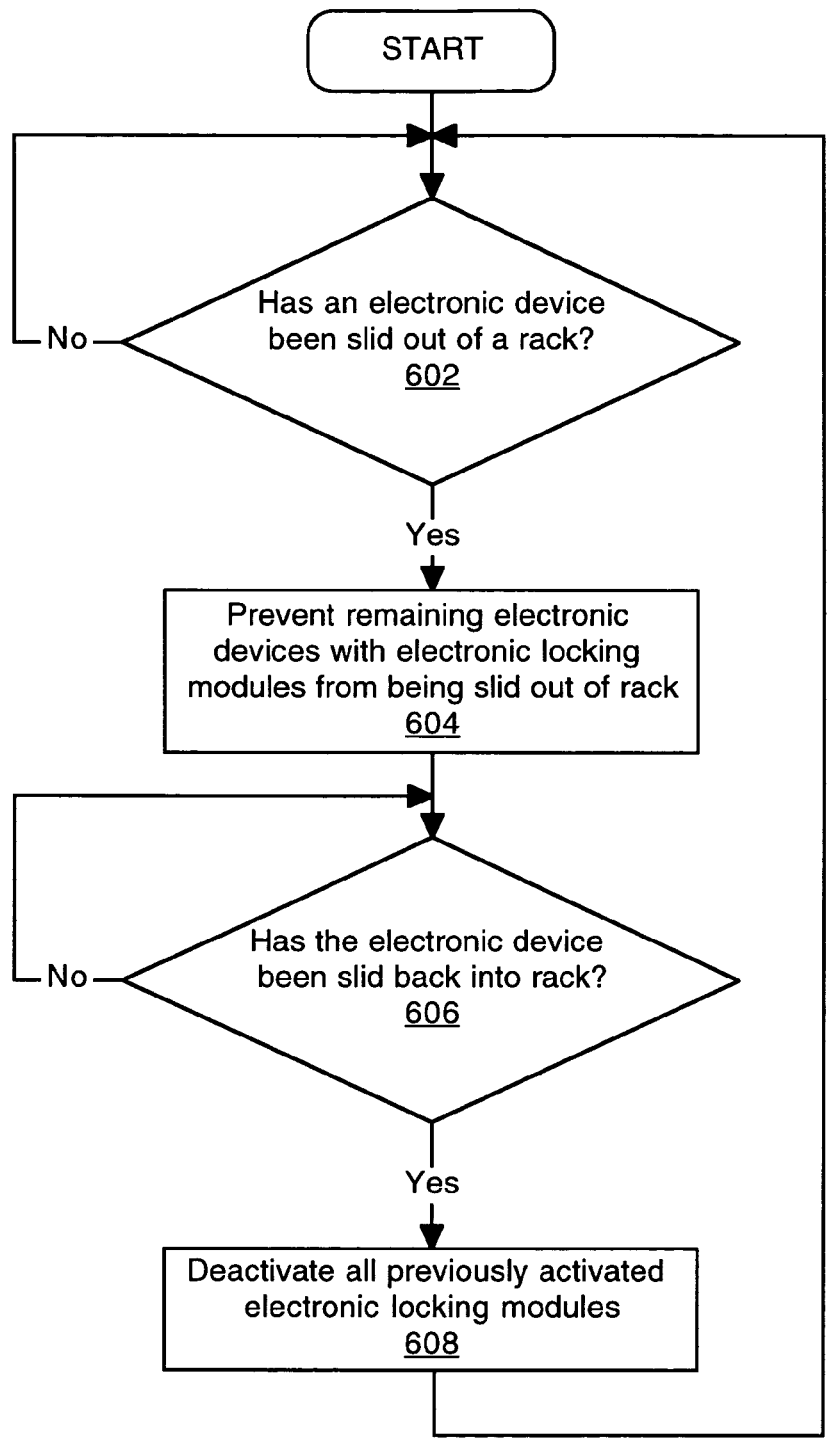
FIG. 6 is a flowchart of operations performed in accordance with an embodiment of the present invention for preventing multiple electronic devices or equipment from being pulled out of an equipment rack simultaneously.

FIG. 6 is a flowchart 600 of operations performed in accordance with an embodiment of the present invention for preventing multiple electronic devices or equipment from being pulled out of an equipment rack simultaneously. Flowchart 600 includes processes which, in some embodiments, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific operations are disclosed in flowchart 600, such operations are exemplary. That is, the present embodiment is well suited to performing various other operations or variations of the operations recited in FIG. 6. Within the present embodiment, it should be appreciated that the operations of flowchart 600 may be performed by software, by hardware or by any combination of software and hardware.

The present embodiment provides a method for preventing multiple electronic devices or equipment from being pulled out of an equipment rack simultaneously. For example, a determination is made with an electronic sensor module as to whether an electronic device of a plurality of electronic devices coupled to an equipment rack is being slid and/or pulled out of the rack. If not, the determination is continually repeated. If so, any remaining electronic devices of the plurality of electronic devices is prevented with an electronic locking module from being slid and/or pulled out of the equipment rack. An additional determination is made as to whether the electronic device is in the process of being and/or has been slid and/or pushed back into the equipment rack. If not, this determination is continually repeated. If so, the activated electronic locking modules are deactivated or disengaged thereby allowing each of the electronic devices to once again be separately pulled and/or slid out of the equipment rack. As such, the method of the present embodiment can then be repeated starting with the first operation.

At operation 602 of FIG. 6, a determination is made with an electronic sensor module (e.g., 116) as to whether an electronic device (e.g., 104 or 106) of a plurality of electronic devices (e.g., 104 and 106) coupled to an equipment rack (e.g., 102) is being slid and/or pulled out of the rack. If an electronic device in not in the process of being slid and/or pulled out of the rack at operation 602, process 600 proceeds to the beginning of operation 602. However, if an electronic device (e.g., 104) is in the process of being slid and/or pulled out of the rack at operation 602, process 600 proceeds to operation 604. It is noted that the electronic sensor module of operation 602 may be implemented and operate in any manner similar to sensor module 116 described herein, but is not limited to such implementations and operations.

At operation 604, any remaining electronic devices (e.g., 106) of the plurality of electronic devices is prevented with one or more electronic locking modules (e.g., 114) from being slid out of the equipment rack. It is noted that each electronic locking module may be implemented in a wide variety of ways in accordance with the present embodiment. For example, the electronic locking module can be implemented and operate in any manner similar to locking module 110 described herein, but is not limited to such implementations and operations.

At operation 606 of FIG. 6, a determination is made as to whether the electronic device (e.g., 104) is in the process of being and/or has been slid and/or pushed back into the equipment rack. If the electronic device is not in the process of being and/or has not been slid and/or pushed back in the rack at operation 606, process 600 proceeds to the beginning of operation 606. However, if the electronic device is in the process of being and/or has been slid and/or pushed back in the rack at operation 606, process 600 proceeds to operation 608. It is noted that the determination at operation 606 can be performed by the electronic sensor module of operation 602 or another sensor module implemented and operational in any manner similar to sensor module 116 described herein, but is not limited to such implementations and operations.

At operation 608, all of the electronic locking modules that were previously activated or engaged are now deactivated or disengaged thereby enabling each of the electronic devices to once again be separately pulled and/or slid out of the equipment rack. Once operation 608 is completed, process 600 proceeds to the beginning of operation 602.

The foregoing descriptions of specific embodiments of the present invention have been presented for purposes of illustration and description. They are not intended to be exhaustive or to limit the invention to the precise forms disclosed, and it is evident many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method comprising:
   determining with an electronic sensor module whether a first electronic device of a plurality of electronic devices coupled to an equipment rack has been pulled out of said equipment rack, wherein said electronic sensor module is coupled to said first electronic device;
   provided said first electronic device has been pulled out of said equipment rack, preventing with an electronic locking module a second electronic device of said plurality of electronic devices from being pulled out of said equipment rack;
   determining with said electronic sensor module whether said first electronic device has been pushed back into said equipment rack; and
   provided said first electronic device has been pushed back into said equipment rack, deactivating said preventing.

2. The method as described in claim 1, wherein said first electronic device is selected from a server computer, a router, a disk array, a computing device, a telecommunications device, an electronic data storage device, and a piece of electronic equipment.

3. The method as described in claim 1, wherein said electronic sensor module is selected from an optical sensor, a proximity sensor, a mechanical switch, an electro-mechanical sensor, a mechanical sensor, an ultrasonic sensor, a hall-effect sensor, and a Linear Variable Differential Transformer (LVDT).

4. The method as described in claim 1, wherein said electronic locking module is selected from a solenoid, a solenoid capable of engaging and disengaging a pin or a type of latch, an electric motor capable of engaging and disengaging a pin or a type of latch, an electro-mechanical device, solid state circuitry, and a magnetic latch.

5. The method as described in claim 1, wherein said electronic sensor module for detecting the proximity of a vertical support column of said equipment rack.

6. The method as described in claim 1, wherein said first electronic device coupled to said equipment rack with a rail slide.

7. The method as described in claim 6, wherein said electronic locking module is coupled to said second electronic device.

8. A system comprising:
   a sensor module for detecting when a first electronic device coupled to an equipment rack has been pulled out of said equipment rack, said sensor module coupled to said first electronic device;
   a locking module for preventing a second electronic device coupled to said equipment rack from being pulled out of said equipment rack when said sensor module detects said first electronic device has been pulled out of said equipment rack; and
   an electronic control module coupled to said sensor module and said locking module.

9. The system of claim 8, wherein said first electronic device and said second electronic device are selected from a server computer, a router, a disk array, a computing device, a telecommunications device, an electronic data storage device, and a piece of electronic equipment.

10. The system of claim 8, wherein said sensor module is selected from an optical sensor, a proximity sensor, a mechanical switch, a mechanical sensor, an electro-mechanical sensor, an ultrasonic sensor, a hall-effect sensor, and a Linear Variable Differential Transformer (LVDT).

11. The system of claim 8, wherein said locking module is selected from a solenoid, an electro-mechanical device, a solenoid capable of engaging and disengaging a pin or a latch, an electric motor capable of engaging and disengaging a pin or a latch, solid state circuitry, and a magnetic latch.

12. The system of claim 8, wherein said electronic control module is selected from a processor, a controller, a state machine, and a microprocessor.

13. The system of claim 8, wherein said sensor module also for detecting when said first electronic device has been pushed back into said equipment rack.

14. The system of claim 8, wherein said locking module is coupled to said second electronic device.

15. A system comprising:
   an electronic sensor module for sensing when a first electronic equipment coupled to an equipment rack has been pulled out of said equipment rack, said electronic sensor module coupled to said first electronic equipment;
   an electronic locking module for restricting a second electronic equipment coupled to said equipment rack from being pulled out of said equipment rack; and
   an electronic control module coupled to said electronic sensor module and said electronic locking module.

16. The system of claim 15, wherein said first electronic equipment and said second electronic equipment are selected from a server computer, a router, a disk array, a computing device, a telecommunications device, an electronic data storage device, and a piece of electronic equipment.

17. The system of claim 15, wherein said electronic sensor module is selected from an optical sensor, a proximity sensor, a mechanical switch, a mechanical sensor, an electro-mechanical sensor, an ultrasonic sensor, a hall-effect sensor, and a Linear Variable Differential Transformer (LVDT).

18. The system of claim 15, wherein said electronic locking module is selected from a solenoid, an electro-mechanical device, a solenoid capable of engaging and disengaging a pin or a latch, an electric motor capable of engaging and disengaging a pin or a latch, solid state circuitry, and a magnetic latch.

19. The system of claim 15, wherein said electronic control module is selected from a processor, a controller, a state machine, and a microprocessor.

20. The system of claim 15, further comprising:
   a second electronic sensor module for sensing when said second electronic equipment has been pulled out of said equipment rack, said second electronic sensor module coupled to said second electronic equipment; and
   a second electronic locking module for restricting said first electronic equipment from being pulled out of said equipment rack, wherein said electronic control module coupled to said second electronic sensor module and said second electronic locking module.

* * * * *